(12) United States Patent
Chen et al.

(10) Patent No.: US 7,549,856 B2
(45) Date of Patent: Jun. 23, 2009

(54) SIDE CORE-PULLING MECHANISM OF MOLD

(75) Inventors: Chih-Yu Chen, Tu-Cheng (TW); Jian-Ren Wang, Tu-Cheng (TW); Yun-Chun He, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 245 days.

(21) Appl. No.: 11/747,062

(22) Filed: May 10, 2007

(65) Prior Publication Data

US 2008/0276744 A1 Nov. 13, 2008

(51) Int. Cl.
*B29C 45/36* (2006.01)
(52) U.S. Cl. .................. 425/577; 425/438; 425/441; 425/DIG. 5
(58) Field of Classification Search .............. 425/438, 425/441, 468, 556, 577, DIG. 5, DIG. 58
See application file for complete search history.

(56) References Cited

U.S. PATENT DOCUMENTS

| | | | | |
|---|---|---|---|---|
| 2,994,921 A | * | 8/1961 | Hultgren | 425/308 |
| 3,849,053 A | * | 11/1974 | Bruce et al. | 425/438 |
| 4,515,342 A | * | 5/1985 | Boskovic | 249/122 |
| 5,397,226 A | * | 3/1995 | Vandenberg | 425/192 R |
| 5,407,344 A | * | 4/1995 | Rombalski et al. | 425/190 |
| 6,116,891 A | * | 9/2000 | Starkey | 425/556 |
| 6,659,760 B2 | * | 12/2003 | Liao et al. | 425/577 |
| 7,121,823 B2 | * | 10/2006 | Chen et al. | 425/438 |
| 7,175,421 B2 | * | 2/2007 | Takemoto et al. | 425/577 |
| 7,381,051 B2 | * | 6/2008 | Wang et al. | 425/577 |
| 2002/0074694 A1 | * | 6/2002 | Kurimoto | 264/318 |
| 2004/0247726 A1 | * | 12/2004 | Takemoto et al. | 425/190 |
| 2005/0208172 A1 | * | 9/2005 | Buttigieg | 425/441 |

* cited by examiner

*Primary Examiner*—Yogendra Gupta
*Assistant Examiner*—Emmanuel S Luk
(74) *Attorney, Agent, or Firm*—Birch, Stewart, Kolasch & Birch, LLP

(57) ABSTRACT

A side core-pulling mechanism of mold includes a slide block, an impacted block and a wobbly block. The bottom of the slide block projects outwards to form a columnar pin. The front surface of the impacted block defines a receiving cavity, a first slot and a second slot. The first slot upright extends downwards to pass through the bottom of the impacted block from the over place of the right end of the receiving cavity and communicates with the right end of the receiving cavity. The second slot extends rightwards and downwards to pass through the bottom of the impacted block from a start end of the first slot. The first and second slots communicate with each other. The columnar pin is movable in the first and second slots. The wobbly block is received in the receiving cavity of the impacted block. The wobbly block is against the bottom wall of the receiving cavity to cut off the first slot at a nature status and rotates upwards in the receiving cavity for making the first slot be in a through status.

8 Claims, 7 Drawing Sheets

SIDE CORE-PULLING MECHANISM OF MOLD

BACKGROUND OF THE INVENTION

1. Field of the Invention

The present invention relates to a side core-pulling mechanism of mold, and more particularly to a side core-pulling mechanism of mold which has a small size and can be easily assembled.

2. The Related Art

The common side core-pulling mechanism includes a cylinder system and a mechanical system. The cylinder system supplies the power energy to the side core-pulling mechanism by a reciprocal motion of a piston in the cylinder. The core-pulling process is accomplished by the cylinder system and the mechanical system working together.

The cylinder system of this common side core-pulling mechanism includes a cylinder base, a fixing part, a hydraulic control valve, a stroke control device and so on. The side core-pulling mechanism is complicated for assembling. It costs too much for producing such a side core-pulling mechanism and is difficult to apply to a mold with a small size.

To overcome the above shortcomings, the present invention tends to provide an improved side core-pulling mechanism with a smaller size for easily being assembled.

SUMMARY OF THE INVENTION

Accordingly, an object of the present invention is to provide a side core-pulling mechanism of mold. The side core-pulling mechanism includes a slide block, a slide block base, an impacted block, a lock block and a slide block return mechanism. The slide block has a base part, the base part has a level first bottom surface, an upright first front surface, a first back surface parallel to the first front surface, and an inclined right surface. A columnar pin projects outwards from the first back surface. The slide block locates on the slide block base and can slide left and right on the slide block base. The impacted block has an upright second front surface, the second front surface defines a receiving cavity, a first slot and a second slot. The first slot upright extends downwards to pass through the bottom of the impacted block from the over place of the right end of the receiving cavity and communicates with the right end of the receiving cavity. The second slot extends rightwards and downwards to pass through the bottom of the impacted block from a start end of the first slot. The first and second slots communicate with each other. The columnar pin is movable in the first and second slots. The lock block leans against the second front surface of the impacted block and moves together with the impacted block. The lock block is located at the right side of the second slot. The lock block includes a base, the base has an inclined left surface. The left surface matches with the inclined right surface of the slide block for firmly locking the slide block. The slide block return mechanism includes a wobbly block received in the receiving cavity of the impacted block. The wobbly block is against the bottom wall of the receiving cavity to cut off the first slot at a nature status and can rotate upwards in the receiving cavity for making the first slot be at a through status.

In summary, the side core-pulling mechanism of mold can realize the side core-pulling process by the cooperation between the slide block return mechanism and the impacted block. Comparing to the conventional side core-pulling mechanism, the side core-pulling mechanism of mold in the present invention do not need extra apparatus providing a driving force to realize the side core-pulling process. Therefore, the side core-pulling mechanism has a smaller size and can be easily assembled.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
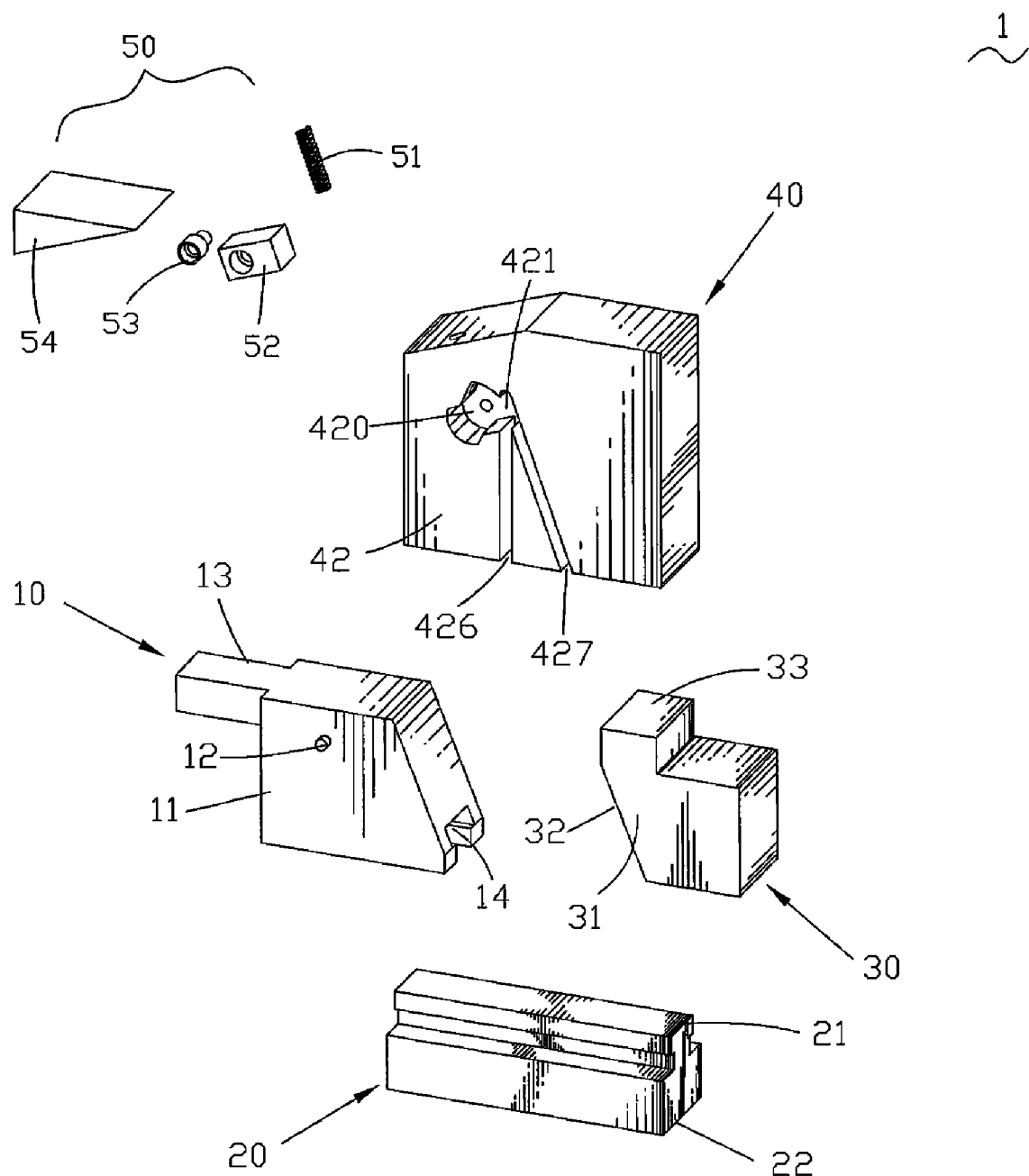
FIG. 1 is an exploded view of a side core-pulling mechanism of mold in the present invention.

Referring now to FIG. 1, a side core-pulling mechanism of mold 1 includes a slide block 10, a slide block base under the slide block 10, a lock block 30 at the right side of the slide block 10, an impacted block 40 on the back of the slide block 10 and a slide block return mechanism 50.

Figure 2:
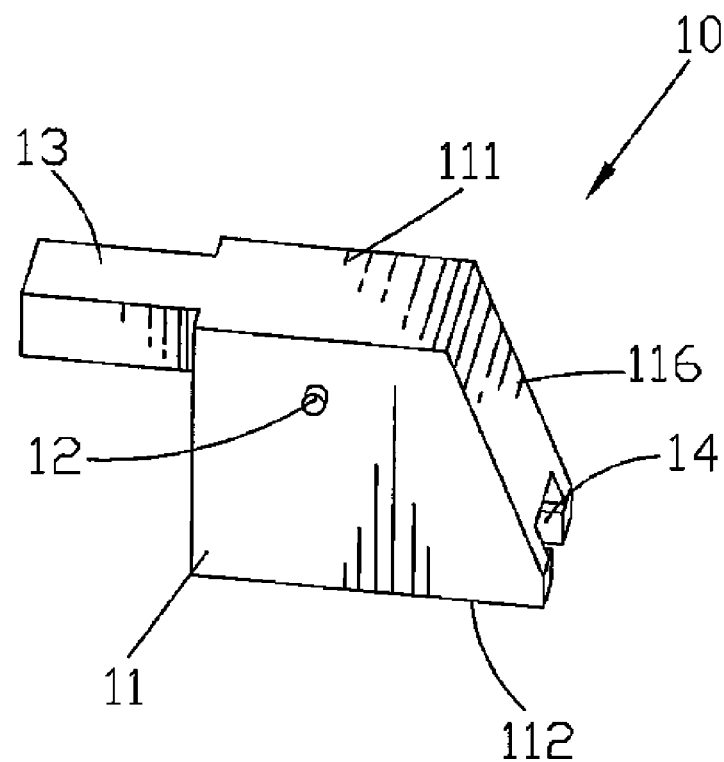
FIG. 2 is a perspective view of a slide block of the present invention.
Figure 3:
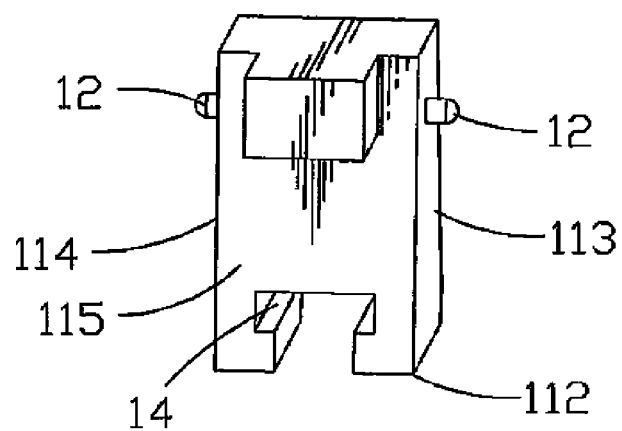
FIG. 3 is a right side view of the FIG. 2.

Referring to FIG. 2 and FIG. 3, the slide block 10 includes a base part 11. The base part 11 includes a level first top surface 111, a first bottom surface 112 parallel to the first top surface 111, an upright first front surface 113, a first back surface 114 parallel to the first front surface 113, an upright first left surface 115, and an inclined right surface 116. The first front surface 113 and the first back surface 114 extend outwards to form two facing columnar pins 12. The top of the first left surface 115 extends outwards to form an insert block 13. The insert block 13 is parallel to the first top surface 111. The bottom surface 112 defines a T shape receiving channel 14 transversely. The receiving channel 14 gets through the first left surface 115 and the right surface 116.

Figure 4:
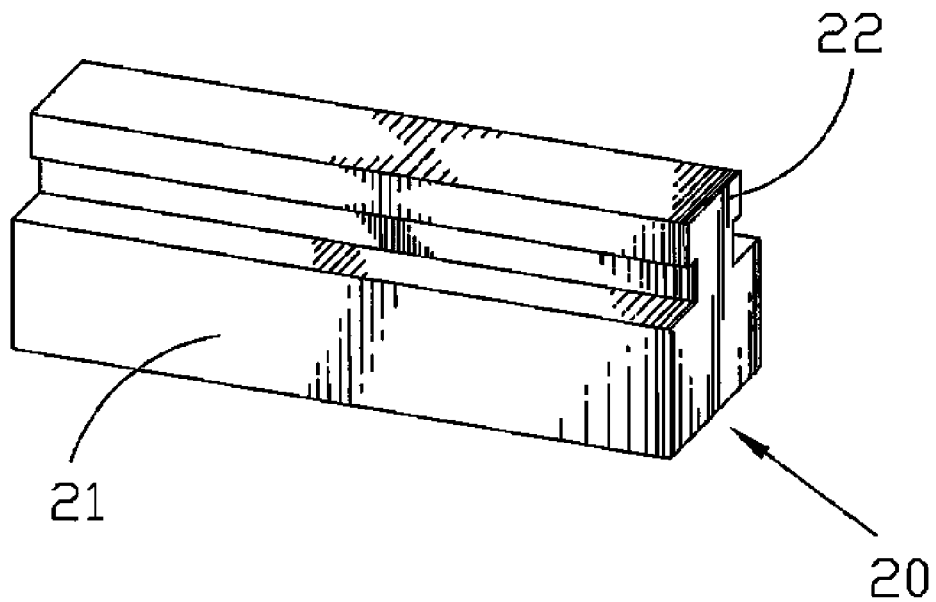
FIG. 4 is a perspective view of a slide block base of the present invention.

Referring to FIG. 4, the slide block base 20 includes a slide base 21. The top of the slide base 21 extends upwards to form a T shape track 22. The slide block base 20 makes the slide block 10 slide on the T shape track 22 of the slide block base 20.

Figure 5:
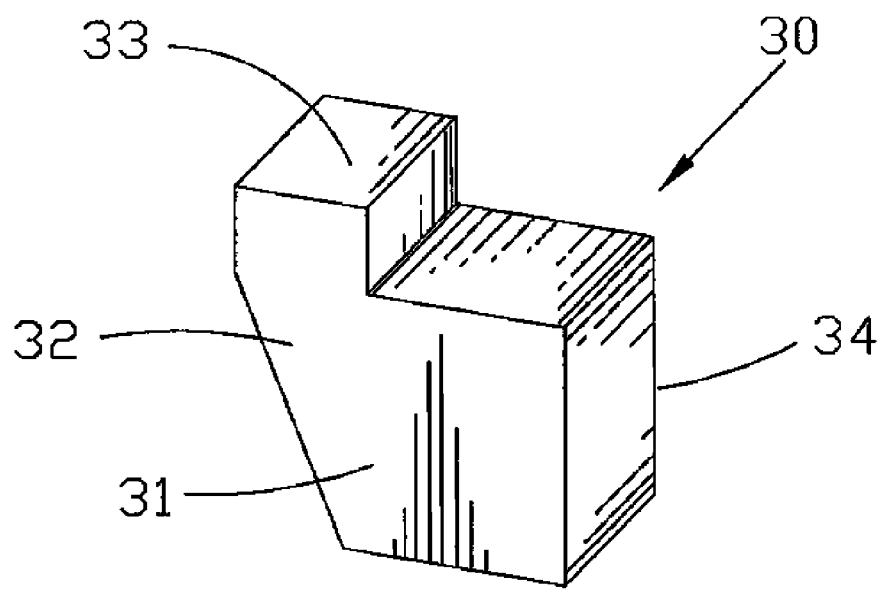
FIG. 5 is a perspective view of a lock block of the present invention.

Referring to FIG. 5, the lock block 30 includes a base 31. The base 31 has an upright second back surface 34 and a second left surface 32. The second left surface 32 is an inclined plane to make the section of the base 31 show a trapezoid shape. The second left surface 32 matches with the inclined right surface 116 of the slide block 10 for firmly locking the slide block 10. The left part of the top of the base 31 extends upward to form a raised lump 33.

Figure 6:
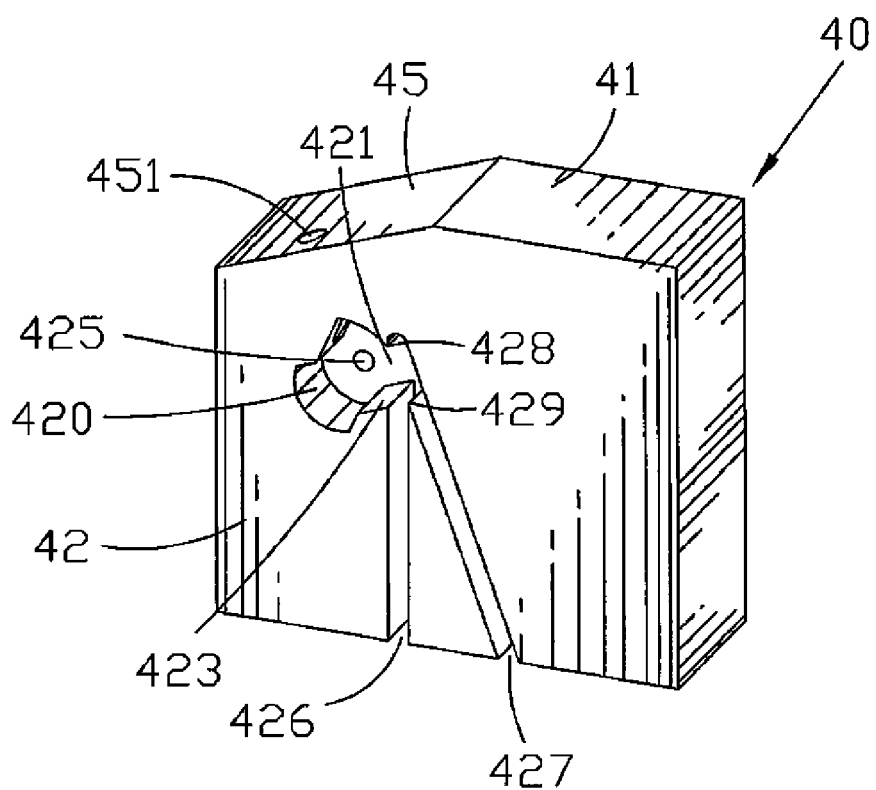
FIG. 6 is a perspective view of an impacted block of the present invention.

Referring to FIG. 6, the impacted block 40 includes a second top surface 41 and a second front surface 42 vertical to the second top surface 41. The second front surface 42 defines a receiving cavity at an upper place of the left. The receiving cavity includes a first receiving cavity 420 extending rightwards and upwards. The first receiving cavity 420 has a rectangular middle portion and two arc-shaped end portions. A second receiving cavity 421 is formed by the first receiving cavity 420 revolving rightwards and downwards. The second receiving cavity 421 also extends rightwards and upwards. The start point of an upper arc-shaped side of the second receiving cavity 421 is just on a finish point of an upper arc-shaped side of the second receiving cavity 420. The lower side wall of the second receiving cavity 421 extends rightwards and upwards to form a contact wall 423. The bottom wall of the second receiving cavity 421 defines a pivot hole 425 on the center of the revolving axle. The second front surface 42 defines an upright first slot 426 which extends downward from the place over the finish point of the upper arc-shaped side of the first receiving cavity 420 to pass through the bottom of the impacted block 40. The second front surface 42 also defines a second slot 427. The second slot 427 extends rightwards and downwards from a start end of the first slot 426 to pass through the bottom of the impacted block 40. The columnar pin 12 of the slide block 10 is moveable in the first slot 426 and the second slot 427. Two slots 426, 427 communicate with each other at upper parts, therefore, an upper end point 428 and a lower end point 429 are formed. The upper end point 428 is the finish point of the upper arc-shaped side of the first receiving cavity 420. The lower end point 429 is a finish point of the upper arc-shaped side of the second receiving cavity 421. The left part of the second top surface 41 is cut to form an inclined plane 45. The inclined plane 45 defines a passing hole 451 therein. The passing hole 451 extends downwards to communicate with the first receiving cavity 420.

Figure 7:
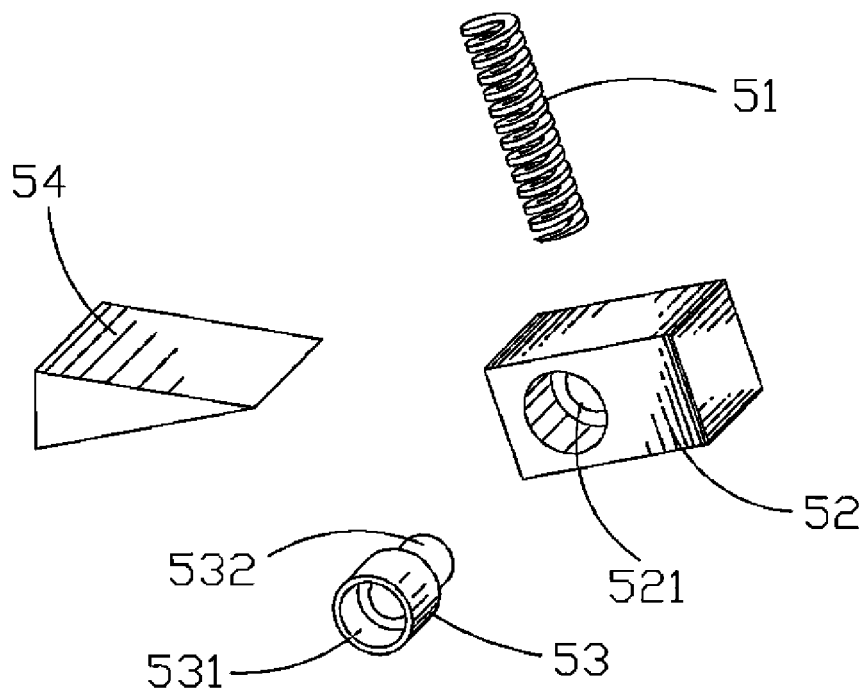
FIG. 7 is a perspective view of a slide block return mechanism of the present invention.

Referring to FIG. 7, the slide block return mechanism 50 includes a spring 51 received in the passing hole 451. A wobbly block 52 is received in the second receiving cavity 421. The shape of the wobbly block 52 is similar to the middle portions of the first receiving cavity 420 and the second receiving cavity 421. The wobbly block 52 is rotatablely received in the receiving cavity. The wobbly block 52 defines a perforation 521. The bottom of the perforation 521 forms a circular wall 522. The slide block return mechanism 50 further comprises a receiving canister 53 and a pressing block 54. The pressing block 54 is pressed on the inclined plane 45. The receiving canister 53 includes a limitative pole 531. The middle of the bottom of the limitative pole 531 extends outward to form an inserted pole 532. The limitative pole 531 is received in the perforation 521 and contacts the circular wall 522. The inserted pole 532 extends outward.

Figure 8:
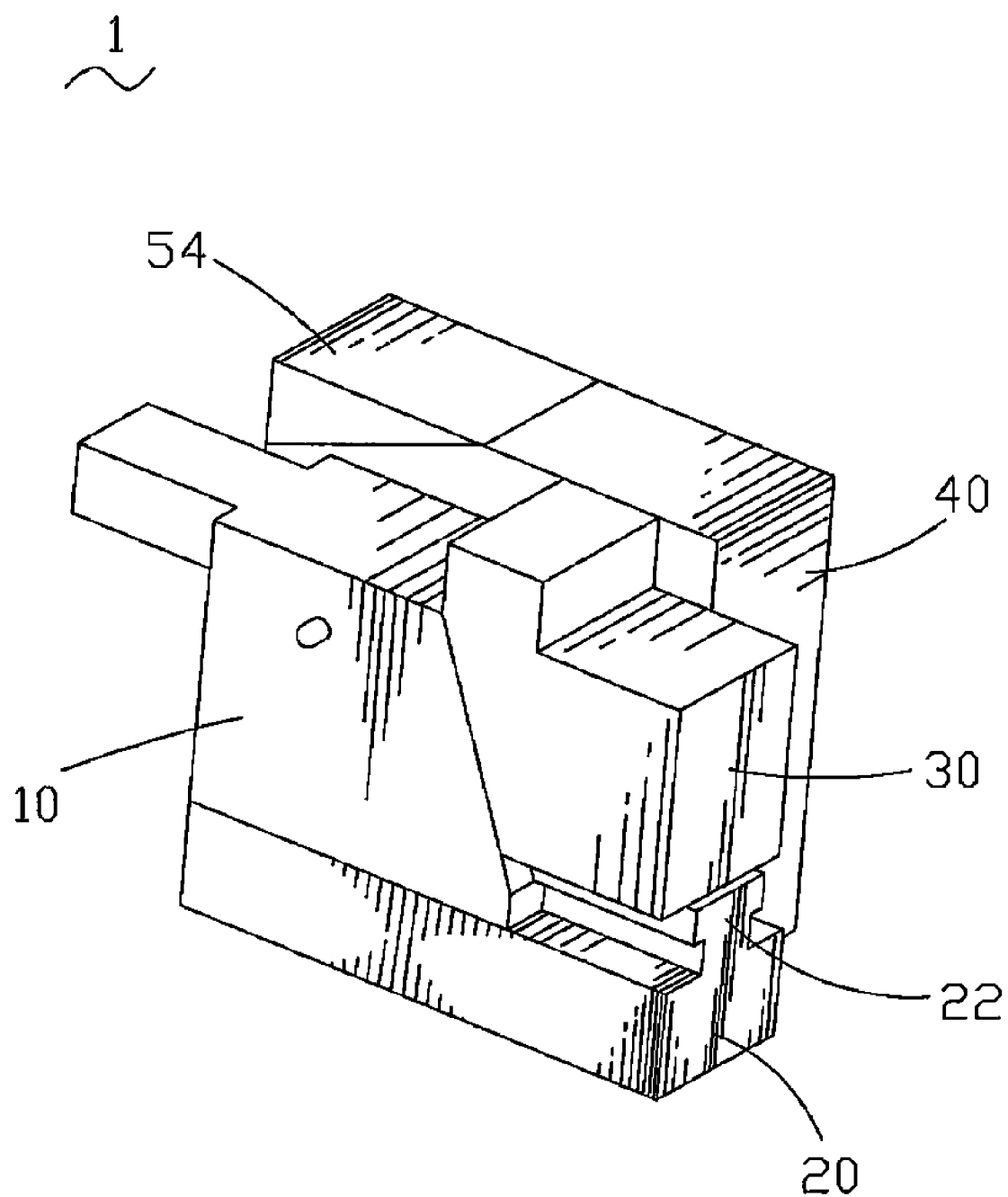
FIG. 8 is a perspective view of the side core-pulling mechanism.

Please integrating FIG. 6 and FIG. 7 to refer to FIG. 8, when fabricating, the receiving channel 14 of the slide block 10 is wedged in the T shape track 22 of the slide block base 20, therefore, the slide block 10 can slide along the track 22. The lock block 30 leans against the second front surface 42 of the impacted block 40 and is located at the right side of the second slot 427. The inserted pole 532 of the receiving canister 53 is received in the pivot hole 425. The spring 51 is received in the passing hole 451. One end of the spring 51 contacts the wobbly block 52 and the other end contacts the pressing block 54. The wobbly block 52 is received in the second receiving cavity 421 and contacts the contact wall 423 at a nature status. Two ends of the top of the wobbly block 52 are located at the upper end point 428 and the lower end point 429 respectively. The first slot 426 is cut off and the second slot 427 is transmitting.

Figure 9:
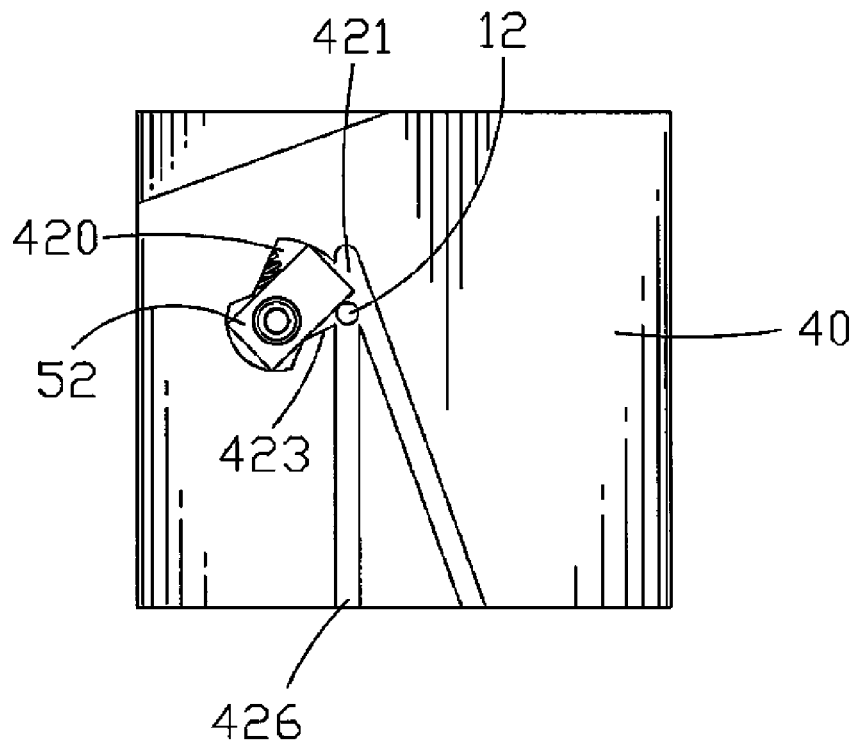
FIG. 9 is a diagram view of the side core-pulling mechanism at the closed status.
Figure 10:
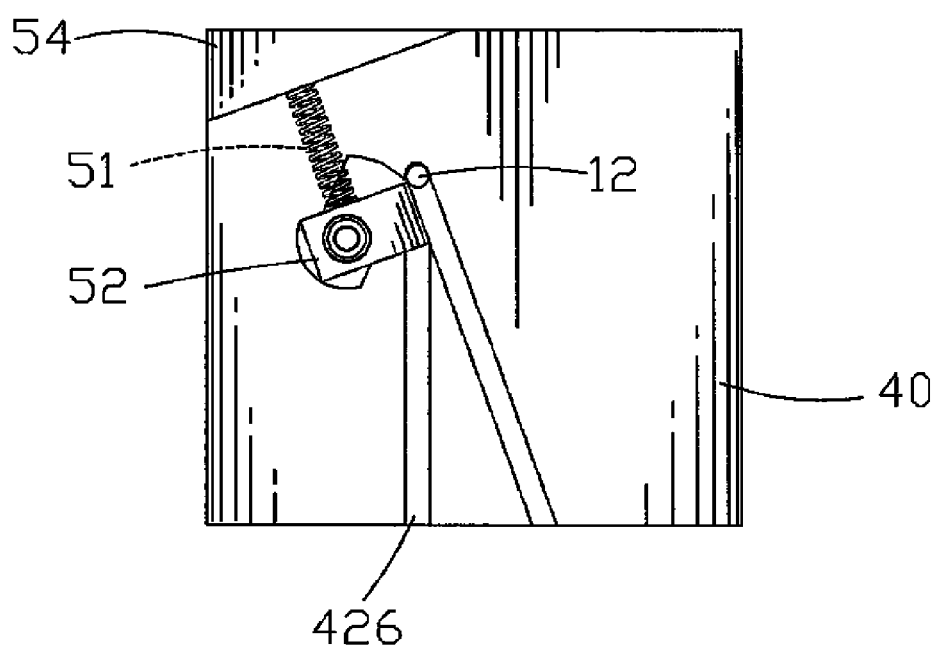
FIG. 10 is another diagram view of the side core-pulling mechanism at the closed status.

Referring to FIG. 9 and FIG. 10, when the mold is closed, the impacted block 40 moves from up to down, therefore, the columnar pin 12 moves in the first slot 426 from down to up relatively. When the columnar pin 12 contacts the wobbly block 52, the wobbly block 52 is revolved from the second receiving cavity 421 to the first receiving cavity 420 by the push of the columnar pin 12, meanwhile, the spring 51 is compressed by the wobbly block 52. When the columnar pin 12 reaches the top of the first slot 426, the wobbly block 52 is revolved upwards to the first receiving cavity 420. At the same time, the columnar pin 12 do not contact the wobbly block 52. The wobbly block 52 is revolved from the first receiving cavity 420 to the second receiving cavity 421 by the push of the spring 51, then the wobbly block 52 contacts the contact wall 423 and cuts off the first slot 426 again. In addition, the lock block 30 moves downwards to the right side of the T shape track 22 by the impacted block 40 driving. The second left surface 32 of the lock block 30 just contacts the right surface 116 of the slide block 10. In the end, the mold is at a closed and stable status.

Figure 11:
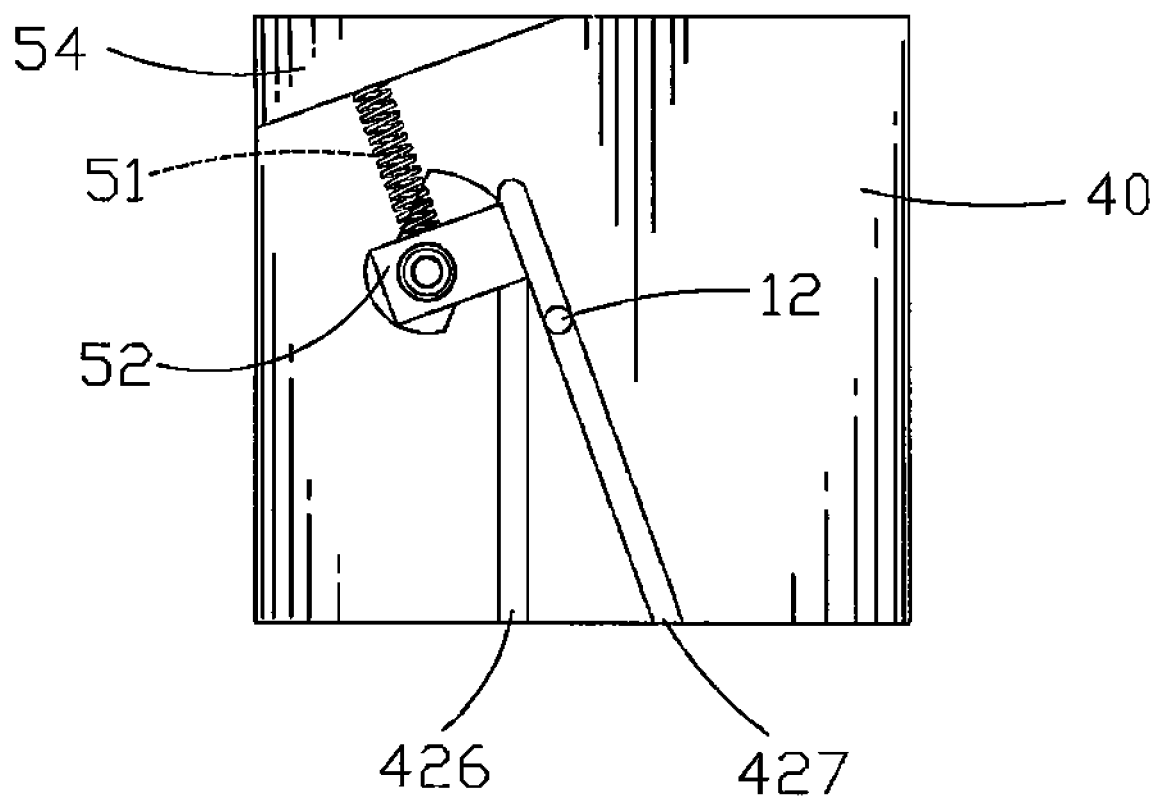
FIG. 11 is a diagram view of the side core-pulling mechanism at the opening status.

Referring to FIG. 11, when the mold is opened, the impacted block 40 moves upwards and drives the lock block 30 to move upwards too. In this time, the first slot 426 is cut off by the wobbly block 52. In addition, the lock block 30 moves upwards to make the slide block 10 have a moving space toward the right side. So the columnar pin 12 moves rightwards and downwards in the second slot 427 relatively and makes the slide block 10 move rightwards on the T shape track 22. Now, the side core-pulling mechanism of mold 1 is finished, and the mold is opened.

As described above, the side core-pulling mechanism of mold 1 can realize the side core-pulling process by the cooperation between the slide block return mechanism 50 and the impacted block 40. Comparing to the conventional side core-pulling mechanism, the side core-pulling mechanism of mold 1 in the present invention do not need extra apparatus providing a driving force to realize the side core-pulling process. Therefore, the side core-pulling mechanism has a smaller size and can be easily assembled.

The foregoing description of the present invention has been presented for purposes of illustration and description. It is not intended to be exhaustive or to limit the invention to precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A side core-pulling mechanism of mold, comprising:
a slide block having a base part, the base part having a level first bottom surface, an upright first front surface, a first back surface parallel to the first front surface, and an inclined right surface, a columnar pin projecting outwards from the first back surface;
a slide block base, the slide block locating on the slide block base and can slide left and right on the slide block base;
an impacted block having an upright second front surface, the second front surface defining a receiving cavity, a first slot and a second slot, the first slot upright extending downwards to pass through the bottom of the impacted block from the over place of the right end of the receiving cavity and communicating with the right end of the receiving cavity, the second slot extending rightwards and downwards to pass through the bottom of the impacted block from the a start end of the first slot, the first and second slots communicating with each other, the columnar pin being movable in the first and second slots;

a lock block leaning against the second front surface of the impacted block and moving together with the impacted block, the lock block located at the right side of the second slot, the lock block including a base, the base having an inclined left surface, the left surface matching with the inclined right surface of the slide block for firmly locking the slide block; and a slide block return mechanism including a wobbly block received in the receiving cavity of the impacted block, the wobbly block being against the lower side wall of the receiving cavity to cut off the first slot at a nature status and can rotate upwards in the receiving cavity for making the first slot be at a through status.

2. The side core-pulling mechanism of mold as claimed in claim 1, wherein the first front surface and the first back surface of the slide block both extend outwards to form two said columnar pins.

3. The side core-pulling mechanism of mold as claimed in claim 1, wherein the first bottom surface of the slide block defines a T shape receiving channel transversely, the slide block base includes a slide base, the top of the slide base extends upwards to form a T shape track, and the T shape receiving channel is movably received in the T shape track.

4. The side core-pulling mechanism of mold as claimed in claim 1, wherein the impacted block places on the top of the slide block base at the closed status of the mold.

5. The side core-pulling mechanism of mold as claimed in claim 1, wherein the receiving cavity includes a first receiving cavity extending rightwards and upwards, the first receiving cavity has a rectangular middle portion and two arc-shaped end portions, a second receiving cavity is formed by the first receiving cavity revolving rightwards and downwards, the second receiving cavity also extends rightwards and upwards, the start point of an upper arc-shaped side of the second receiving cavity is just on a finish point of an upper arc-shaped side of the second receiving cavity, the structure of the wobbly block is corresponding with the middle portions of the first and the second receiving cavities.

6. The side core-pulling mechanism of mold as claimed in claim 5, wherein the first slot extends downwards from the place over the finish point of the upper arc-shaped side of the first receiving cavity, an upper end point and a lower end point are formed at the communicating place of the first and second holes, the upper end point is the finish point of the upper arc-shaped side of the first receiving cavity, the lower end point is a finish point of the upper arc-shaped side of the second receiving cavity.

7. The slide block as claimed in claim 1, wherein the bottom wall of the second receiving cavity defines a pivot hole on the center of the revolving axle, the wobbly block defines a perforation, the bottom of the perforation forms a circular wall, the slide block return mechanism further comprises a receiving canister, the receiving canister includes a limitative pole, the middle of the bottom of the limitative pole extends to form an inserted pole, the limitative pole is received in the perforation and contacts the circular wall, the inserted pole stretches out.

8. The slide block as claimed in claim 1, wherein the left part of the second top surface is cut to form an inclined plane, the inclined plane defines a passing hole therein, the passing hole extends downwards to communicate with the first receiving cavity, the slide block return mechanism is further comprising a spring received in the passing hole and a pressing block pressing on the inclined plane, one end of the spring contacts the wobbly block and the other end contacts the pressing block.

* * * * *